United States Patent [19]

Doyle

[11] Patent Number: 5,095,193
[45] Date of Patent: Mar. 10, 1992

[54] CARTRIDGE HEATER HAVING RESILIENT RETAINING MEANS

[75] Inventor: Steven A. Doyle, Oregon, Wis.

[73] Assignee: Ogden Manufacturing Co., Arlington Heights, Ill.

[21] Appl. No.: 531,942

[22] Filed: Jun. 1, 1990

[51] Int. Cl.⁵ .......................... H05B 3/00; H05B 3/82
[52] U.S. Cl. ...................... 219/536; 219/523; 219/544; 219/534
[58] Field of Search .............. 219/533, 534, 536, 537, 219/542, 523, 222–226; 165/80.1, 80.2

[56] References Cited

U.S. PATENT DOCUMENTS

| | | | |
|---|---|---|---|
| 1,279,111 | 9/1918 | Homan | 219/523 |
| 1,312,485 | 8/1919 | Krauth | 403/329 |
| 1,935,560 | 11/1933 | Herold | 16/39 |
| 2,062,424 | 12/1936 | Mueller | 403/326 |
| 3,412,231 | 11/1968 | McElligott | 219/536 |
| 3,581,056 | 5/1981 | Djenner | 219/222 |
| 3,643,988 | 2/1972 | Ingvartsen | 287/53.5 |
| 3,937,923 | 2/1976 | Smith | 219/523 |
| 4,822,980 | 4/1989 | Carbone et al. | 219/534 |

Primary Examiner—Bruce A. Reynolds
Assistant Examiner—Michael D. Switzer

[57] ABSTRACT

A cartridge heater for insertion within a heater borehole or cavity having a peripheral cavity wall surface. The cartridge heater includes an elongated generally cylindrical sheath having a heating element disposed therein and having an internal spring chamber intersected by a pair of elongated slots formed in the sheath. A generally V-shaped spring member is disposed within the spring chamber and has a pair of arcuately shaped arm portions projecting outwardly through the elongated slots for frictional engagement against the wall surface of the cavity to retain the cartridge heater within oversize cavities. The spring chamber may be formed as an extension of the forward or rearward ends of the cartridge sheath.

11 Claims, 1 Drawing Sheet

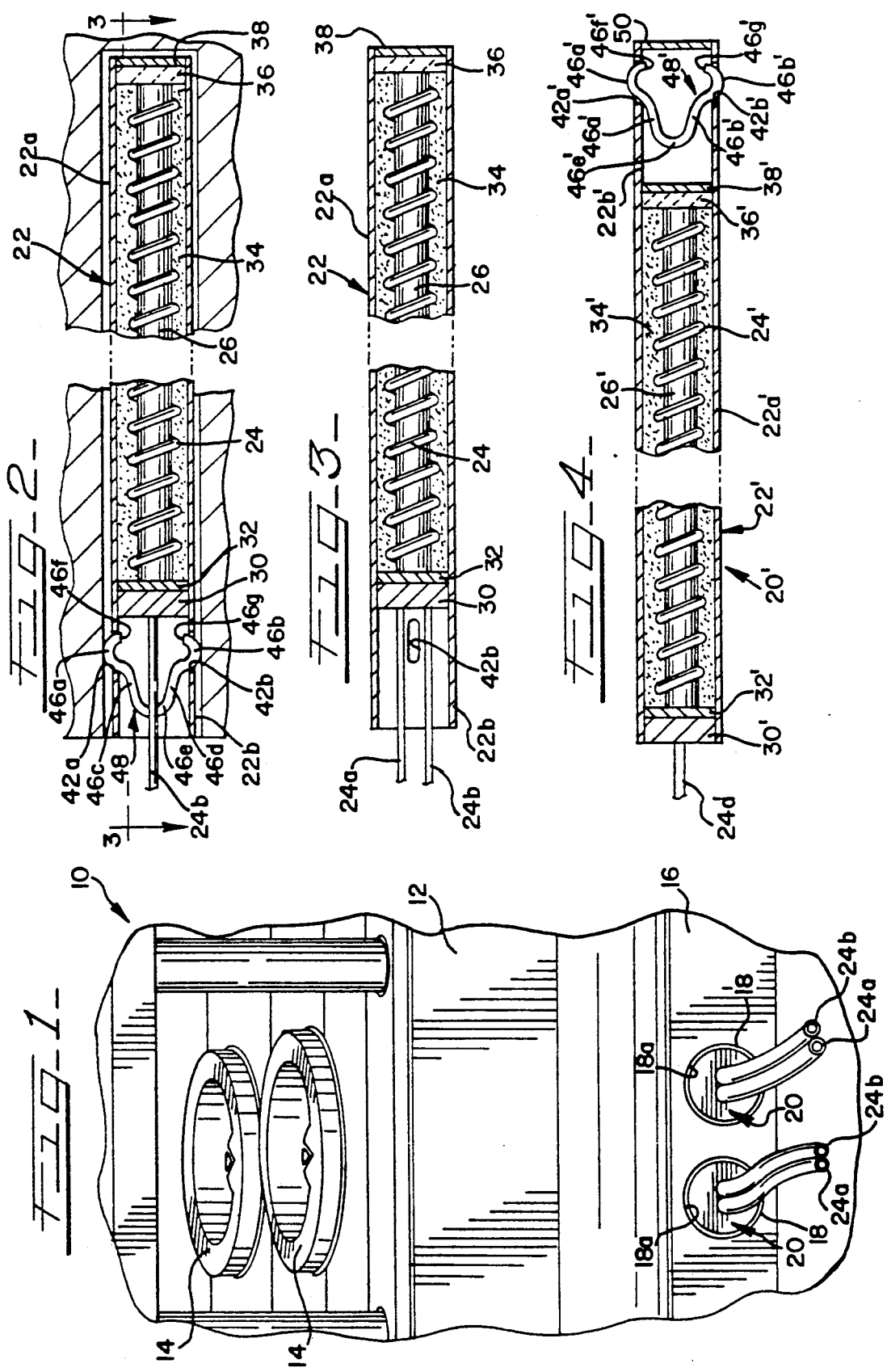

CARTRIDGE HEATER HAVING RESILIENT RETAINING MEANS

BACKGROUND OF THE INVENTION

The present invention relates generally to cartridge type heaters, and more particularly to a cartridge heater having novel means for releasably retaining the cartridge heater within an oversize cavity into which the heater may be inserted.

It is a common practice in many types of machines, such as plastic molding machines and the like, to provide heater bore-holes or cavities in selected positions in a mold or die support housing or in a heater support header. Cartridge type heaters are inserted into the bore-holes or cavities to facilitate heating of the associated molds to desired temperatures during operation. The cartridge heaters conventionally include cylindrical metallic tubular sheaths which receive inner heating cores having electrical wire resistance elements adapted for connection to an electrical power supply. The wire resistance element is generally helically coiled on an insulating core, and a mineral insulating material having low electrical conductivity and high thermal conductivity, such as magnesium oxide, is compacted into the annular space between the coiled core and the outer sheath.

The heater receiving bores or cavities and the cartridge heater sheaths are generally cylindrical and sized to provide a snug fit for optimal heat transfer while enabling the cartridge heaters to be readily inserted into and removed from the bore-holes or cavities. It is important that the cartridge heaters be retained within the bore-holes or cavities so as to resist displacement from the cavities when subjected to vibration or other motion during operation of the associated machine. Unintentional displacement from the heater cavity may lead to overheating and burnout, and thus premature failure of the cartridge heater. This may present a significant problem when the cross-sectional area of the heater receiving bore or cavity is oversize, which may result if the cavity has a relatively broad tolerance range.

A prior technique for addressing the aforedescribed problem has been to secure an external washer or bracket to the cartridge heater which enables the heater to be physically attached to the device to be heated. This technique has significant drawbacks such as increased cost and limited applicability where space limitations prevent its use.

Another prior technique for addressing the problem of oversize heater cartridge bores utilizes metallic sleeves which have inside diameters to closely receive associated cartridge sheaths, and have outside diameters to closely fit within the larger diameter bore. See, for example, U.S. Pat. No. 3,937,923. A disadvantage of this technique is the requirement for an inventory of sleeves needed to meet varying diameter cartridge heater bores.

Still another prior technique for addressing this problem is to form tapered heater cartridge bore holes in the header flange, and to place the cartridge heater into a heat conducting compressible tapered bushing which is then driven into the tapered bore hole until the bushing fits snugly into the bore hole and lightly holds the cartridge heater in place. See, for example, U.S. Pat. No. 3,412,231.

SUMMARY OF THE INVENTION

One of the primary objects of the present invention is to provide a cartridge type heater having novel means for frictionally retaining the cartridge heater within an oversize bore-hole or cavity.

A more particular object of the present invention is to provide a cartridge type heater having novel spring means operative to frictionally engage the wall of a bore-hole or cavity into which the cartridge heater is inserted so as to facilitate retention of the cartridge heater within oversize bore-holes or cavities.

Another object of the present invention is to provide a cartridge type heater having a cylindrical outer sheath and wherein retainer spring means in the form of a generally V-shaped spring is carried within the sheath and has arms extending outwardly from the outer peripheral surface of the sheath in a manner to frictionally engage the wall of a cavity into which the cartridge heater is inserted.

In carrying out the present invention, a cartridge heater having a generally cylindrical tubular sheath is formed with an axial sheath extension which establishes a discreet internal spring chamber integral with the cartridge. Two elongated slots are formed through the sheath extension wall in diametrically opposite relation. A generally U-shaped wire spring is inserted into the spring chamber such that arcuately shaped arm portions of the spring project through the opposed elongated slots outwardly of the outer surface of the sheath. When the cartridge heater is inserted into a bore-hole or cavity, the projecting spring arm portions frictionally engage the wall of the bore-hole or cavity to retain the cartridge heater within the cavity. The spring chamber may be formed at the rear lead-wire end of the sheath or at the forward entry end in which case a plug may be fixed to the end of the sheath to close the spring chamber. If a water resistant seal is required, the sheath extension may be filled with a suitable silicone sealant.

Further objects, advantages and features of the invention will become apparent from the following detailed description when taken in conjunction with the accompanying drawing wherein like reference numerals designate like elements throughout the several views.

BRIEF DESCRIPTION OF THE DRAWING

FIG. 1 is a fragmentary perspective view of a plastic molding machine having cartridge heaters in accordance with the present invention inserted into a header block;

FIG. 2 is a foreshortened generally longitudinal sectional view of a heater cartridge constructed in accordance with one embodiment of the present invention, shown inserted within the header block;

FIG. 3 is a foreshortened generally longitudinal sectional view of the cartridge heater of FIG. 2, taken substantially along the line 3—3 of FIG. 2 and with the retaining spring removed; and FIG. 4 is a foreshortened generally longitudinal sectional view of an alternative embodiment of a cartridge heater in accordance with the present invention;

DETAILED DESCRIPTION

Referring now to the drawing, FIG. 1 illustrates a fragmentary portion of a plastic molding machine, indicated generally at 10, having a mold support plate 12 which supports a plurality of molds 14. In the illustrated embodiment, the molds 14 are tubular and extend through a header plate 16 which has a plurality of cylindrical heater bore-holes or cavities 18 formed generally transverse to the longitudinal axes of the molds 14. The heater bore-holes or cavities 18 are cylindrical and have generally the same nominal diameter. However, due to relatively broad tolerance ranges, the diameters of the individual bore-holes or cavities 18 may vary by a few hundredths of an inch. Under this condition, if a cylindrical cartridge heater, such as indicated generally at 20, having an outer diameter on the low side of its dimensional tolerance range is inserted into a bore-hole or cavity having a diameter formed on the high end of its dimensional tolerance range, a slight clearance may result between the outer peripheral surface of the cartridge heater and the annular surface 18a of the bore-hole or cavity. Such clearance may lead to longitudinal displacement of a cartridge heater from its corresponding bore-hole or cavity if subjected to longitudinal vibrations during operation of the molding machine, with resulting overheating and potential burnout and premature failure of the cartridge heater unless restrained against such displacement.

Referring now to FIGS. 2 and 3, a cartridge heater 20 constructed in accordance with one embodiment of the present invention includes an elongated outer metallic sheath 22 having a cylindrical outer peripheral surface 22a. The cartridge sheath 22 is preferably made of corrosion resistant stainless steel and houses an inner heater core having an electrical resistance wire element 24 which is helically coiled or wound on a generally cylindrical elongated insulating core 26. The resistance wire element 24 has insulated lead ends 24a and 24b which extend from an open rear or lead-wire end of the sheath 22 and are adapted for connection to a suitable electrical power supply. In the illustrated embodiment, a ceramic insulating plug 30, such as lava, is inserted within the rear end of the cartridge sheath 22 and abuts a metallic spacer 32 fixed transversely within the sheath to close one end of a cylindrical internal heater core chamber defined within the cartridge sheath. The spacer 32 and insulating plug 30 have suitable openings therethrough to receive the leads 24a, 24b of the resistance wire element 24.

A mineral insulating material 34 having low electrical conductivity and high thermal conductivity, such as magnesium oxide, is compacted into the annular space between the inner heating core and the inner surface of the cartridge sheath 22 after which a ceramic end wall 36 is inserted within the forward end of the cartridge sheath. A stainless steel slug 38 is suitably welded transversely to the forward end of the metallic sheath 22. The cartridge heater 20 thus far described is of known design and is commercially available from Ogden Manufacturing Co., Arlington Heights, Illinois, the assignee of the present invention.

In accordance with the present invention, the cylindrical tubular sheath 22 is formed to extend longitudinally outwardly from the lead end lava plug 30 of the cartridge heater so as to define a spring chamber within a tubular extension, as indicated at 22b. For a cartridge heater having a nominal outer diameter of approximately five-eighths inch, the tubular extension 22b is formed with a longitudinal length of approximately one inch. A pair of elongated slots 42a and 42b are formed through the wall of the tubular extension 22b in diametrically opposed relation. Preferably the longitudinal centers of the elongated slots 42a,b lie in a plane containing the longitudinal axis of the tubular sheath extension 22b and passing between the two leads 24a and 24b of the heater resistance wire 24.

The slots 42a,b are sized and positioned along the length of the sheath extension 22a so as to receive arcuately formed arm portions 46a and 46b of retainer spring means in the form of a generally V-shaped spring, indicated generally at 48. The arcuately shaped arm portions 46a and 46b are formed at the ends of generally straight arm or leg portions 46c and 46d, respectively, of the spring 48 which are joined in an arcuate connection or apex 46e. The spring 48 is made of a suitable spring wire, such as what is generally termed music wire, and is initially formed so that when the spring is inserted into the open tubular sheath extension 22b, the arcuate arm portions 46a and 46b are compressed laterally toward each other. The elongated slots 42a and 42b are of predetermined length so that the spring 48 may be moved longitudinally within the tubular sheath extension 22b and cause the arcuate arm portions 46a,b to project through the elongated slots and extend radially outwardly of the outer diameter of the tubular extension, while the free terminal ends 46f and 46g of the arms remain within the tubular sheath extension. If desired, a water resistant sealant, such as a suitable silicone, may be inserted into the sheath extension 22b.

In this manner, when the cartridge heater 20 is inserted within a heater bore-hole or cavity 18 having a diameter slightly larger than the outer diameter of the cartridge sheath 22, that is, a diameter termed oversize relative to an optimum diameter which would provide a close fit with the cartridge sheath, the arm portions 46a,b of spring 48 will engage the cavity wall surface 18a and be compressed so as to create a relatively tight frictional reaction force between the spring arms and the cavity wall. Thus, if the bore-hole or cavity 18 has a diameter slightly greater than the diameter of the cartridge heater sheath as a result of relatively broad manufacturing tolerance ranges for the cartridge sheath and bore-hole, the cartridge heater will be frictionally retained within the bore-hole by the retaining spring 48 and will not be displaced in the event the header plate 16, or other device into which the cartridge heater is inserted, is subjected to vibration or other movement during shipping or operation. By retaining the terminal ends 46f,g of the spring arm portions 46a,b within the tubular sheath extension, no sharp edges or corners on the spring ends are exposed externally of the cartridge heater sheath which could mar or otherwise inhibit sliding insertion and withdrawal of the cartridge heater from an associated bore-hole or cavity. It will be understood that the dimensions of the elongated slots 42a,b, the length of the sheath extension defining the spring chamber, and the size and gauge of the retainer spring may vary with different diameter cartridge sheaths.

FIG. 4 illustrates an alternative embodiment of a cartridge type heater, indicated generally at 20', which is substantially similar to the aforedescribed cartridge heater 20 except in the positioning and orientation of the retaining spring to frictionally retain the cartridge heater within an oversize heater bore-hole or cavity. The elements of the cartridge heater 20' which are substantially identical to corresponding elements in the cartridge heater 20 are indicated by corresponding but primed reference numerals and need not be described again in detail.

The cartridge heater 20' includes a tubular metallic sheath 22' which houses a heating core and is formed to extend longitudinally forwardly from a transverse forward end slug 38' fixed within the tubular sheath, thereby defining a spring chamber within a tubular extension 22'b at the forward end of the cartridge heater opposite the end through which resistance wire lead ends 24'a and 24'b project. The sheath extension 22'b is sheath 22' and receives a ceramic end wall or disc 36' which abuts the inner surface of a transverse stainless steel slug or disk 38'. For a sheath 22' having a nominal diameter of approximately five-eighths inch, the tubular extension 22'b is preferably formed with a longitudinal length of approximately one inch. A pair of elongated slots 42'a and 42'b are formed through the wall of the tubular extension 22'b in diametrically opposed relation.

Retainer spring means in the form of a generally V-shaped wire spring 48' is inserted into the open end of the tubular sheath extension 22'b so that arcuate arm portions 46'a and 46'b of the spring extend through the slots 42'a and 42'b outwardly of the outer peripheral surface of the tubular sheath extension. In similar fashion to the cartridge heater 20, the spring arm portions 46'a and 46'b and the elongated slots 42'a and 42'b in the sheath extension 22'b are configured such that terminal or free ends 46'f and 46'g of the spring arms do not extend outwardly from the tubular sheath, thus preventing sharp edges or corners on the spring arms from exposure externally of the sheath.

After insertion of the spring 48' into the sheath extension 22'b such that its arcuate arm portions 46'a and 46'b extend through the elongated slots 42'a and 42'b, a metallic end member or disc 50 is pressed into the end of the tubular extension 22'b and welded about its periphery to the marginal edge of the sheath extension. Insertion of the thus formed alternate cartridge heater 20' into a heater bore-hole or cavity 18 which is oversize relative to the nominal outer diameter of the cartridge heater sheath 22' causes the spring arms 46'a and 46'b to frictionally engage the wall of the bore-hole or cavity and prevent inadvertent displacement of the cartridge heater from the bore-hole when the associated header, or other device in which the bore-holes or heater cavities are formed, is subjected to vibration or other movement which might otherwise displace the cartridge heater longitudinally from the bore-hole or cavity. On the other hand, if the bore-hole or cavity into which the cartridge heater is inserted has minimal clearance with the cartridge sheath, the spring arms 46'a and 46'b will readily be compressed so as not to inhibit insertion or withdrawal.

Thus, in accordance with the invention, a cartridge heater is provided having novel spring means for retaining the cartridge heater within a bore-hole or cavity having a diameter which may vary considerably from the nominal diameter of the cartridge heater sheath due to a relatively broad manufacturing tolerance range. The cartridge heater retaining spring eliminates the need for maintaining close manufacturing tolerances for the heater bore-holes or cavities, with attendant reduction in manufacturing costs.

While preferred embodiments of the present invention have been illustrated and described, it will be understood that changes and modifications may be made therein without departing from the invention in its broader aspects. Various features of the invention are defined in the following claims.

What is claimed is:

1. A cartridge heater for insertion within an elongated cavity defined by a peripheral cavity wall surface, said cartridge heater comprising an elongated sheath having an outer peripheral surface, a heating element disposed within said sheath, said sheath being adapted for longitudinal insertion within said cavity and having at least one internal longitudinally extending spring chamber, and spring means disposed within said internal chamber and having arm portions projecting outwardly of said sheath in generally diametrically opposed relation therefrom for sliding frictional engagement against the inner wall surface of said cavity when said cartridge heater is inserted therein, said arm portions being operative to retain the cartridge heater within said cavity in substantially coaxial relation therewith.

2. A cartridge heater as defined in claim 1 wherein said sheath has a pair of generally diametrically opposed elongated slots formed therein communicating with said spring chamber, said spring means comprising a spring member having said arm portions formed thereon and adapted to project through said elongated slots so as to extend outwardly from the outer peripheral surface of said sheath.

3. A cartridge heater as defined in claim 2 wherein said arm portions of said spring member are arcuately shaped, said elongated slots and said arm portions being configured to enable projection of only said arcuate arm portions through said elongated slots.

4. A cartridge heater as defined in claim 3 wherein said spring member comprises a generally V-shaped spring having terminal ends adjacent said arcuate arm portions, said elongated slots cooperating with said spring member to prevent outward extension of said terminal ends through said elongated slots.

5. A cartridge heater as defined in claim 1 wherein said elongated sheath has opposite ends and a substantially cylindrical outer peripheral surface, said heating element having electrical resistance wire lead ends extending outwardly from one end of said elongated sheath, and said internal spring chamber being formed at a selected one of the opposite ends of said sheath.

6. A cartridge heater as defined in claim 5 wherein said internal spring chamber is formed at the end of said sheath opposite said resistance wire lead ends, and including an end cap closing the distal end of said internal spring chamber.

7. A cartridge heater as defined in claim 5 wherein said internal spring chamber is defined by a longitudinal extension of said sheath at the end thereof from which the resistance wire lead ends extend, said elongated slots being formed in said sheath extension in diametrically opposed relation.

8. A cartridge heater for insertion within a generally cylindrical bore-hole or cavity defined by a peripheral wall surface, said cartridge heater comprising an elongated generally cylindrical sheath having first and second ends and defining an internal heating element chamber, a heating element disposed within said heating element chamber and having at least one wire lead end extending outwardly from said first end of said sheath so as to intersect said internal spring chamber, and a spring member disposed within said internal spring chamber and having arcuate arm portions projecting outwardly through said elongated slots for frictional engagement against generally diametrically opposed inner surface portions of the cavity wall when said cartridge heater is inserted therein so as to retain said cartridge in substantially coaxial relation within the cavity.

9. A cartridge heater as defined in claim 8 wherein said spring member comprises a generally V-shaped spring having said arcuate arm portions formed thereon, said elongated slots and said arcuate arm portions being configured to enable projection of only said arcuate arm portions through said slots.

10. A cartridge heater as defined in claim 8 wherein said spring chamber is formed within a longitudinal extension of said sheath at a selected one of said opposite ends thereof.

11. A cartridge heater as defined in claim 9 wherein said elongated slots are disposed in diametrically opposed relation.

* * * * *